Figure 1:
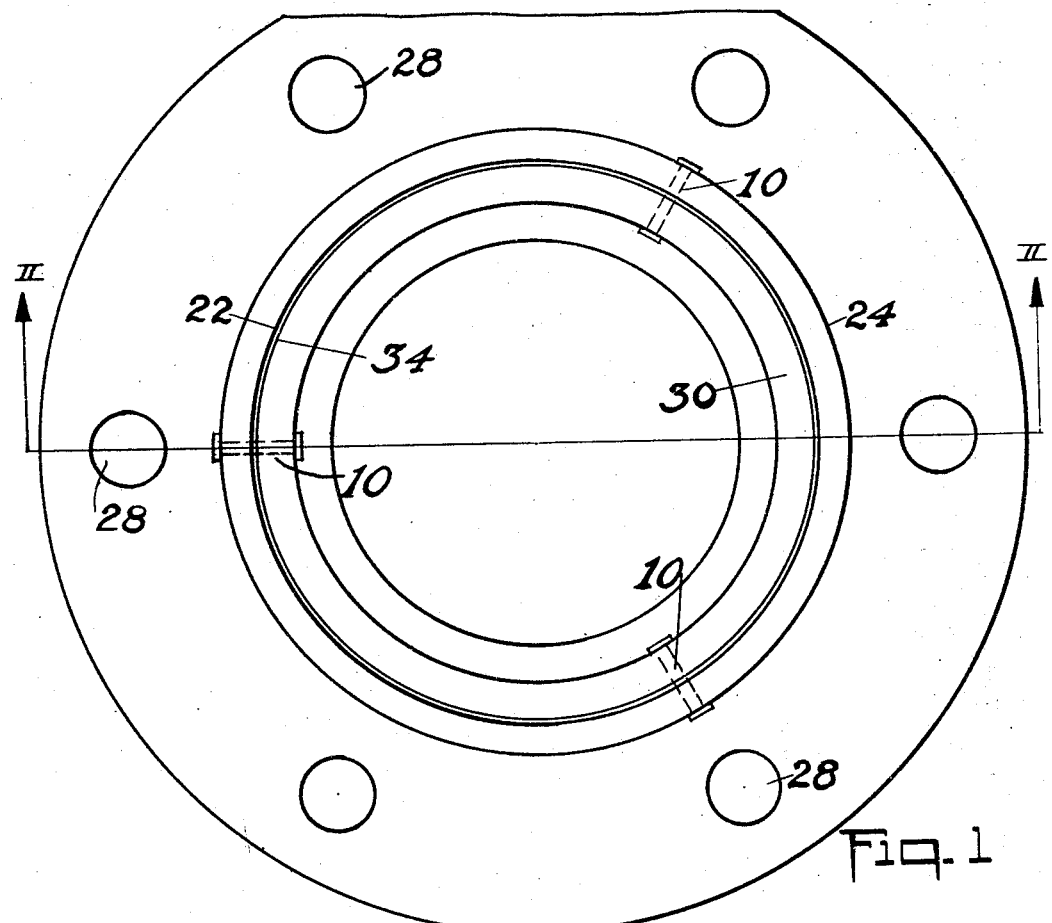

Nov. 8, 1949  L. M. COOPER  2,487,104
PRESSURE VESSEL SAFETY DEVICE
Filed Feb. 14, 1945  3 Sheets-Sheet 1

Lyle M. Cooper Inventor
By P. L. Young Attorney

Nov. 8, 1949 L. M. COOPER 2,487,104
PRESSURE VESSEL SAFETY DEVICE
Filed Feb. 14, 1945 3 Sheets-Sheet 2
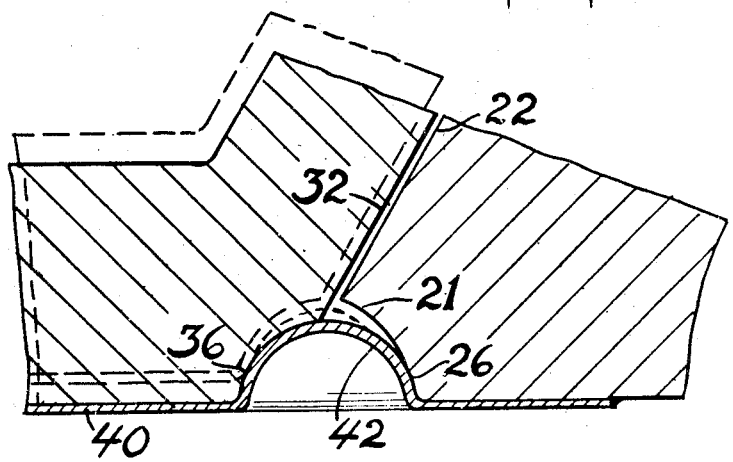
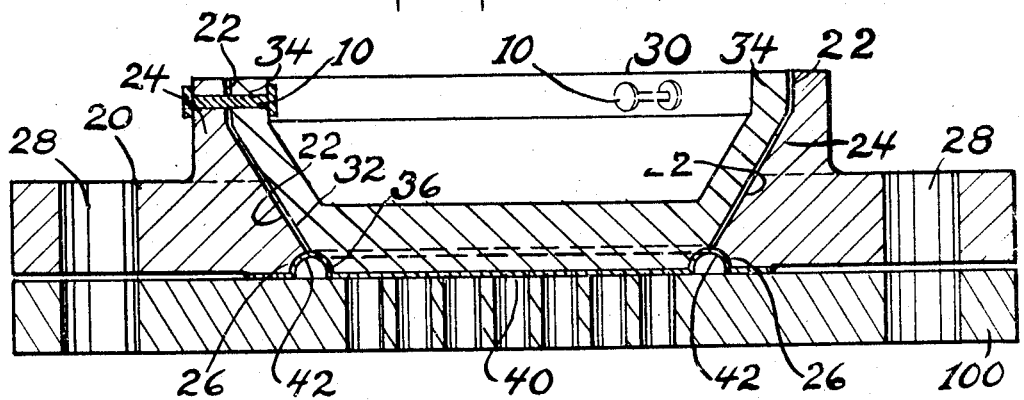
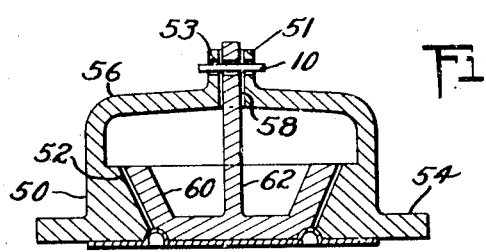
Lyle M. Cooper Inventor
By P. L. Young Attorney Nov. 8, 1949 L. M. COOPER 2,487,104
PRESSURE VESSEL SAFETY DEVICE
Filed Feb. 14, 1945 3 Sheets-Sheet 3
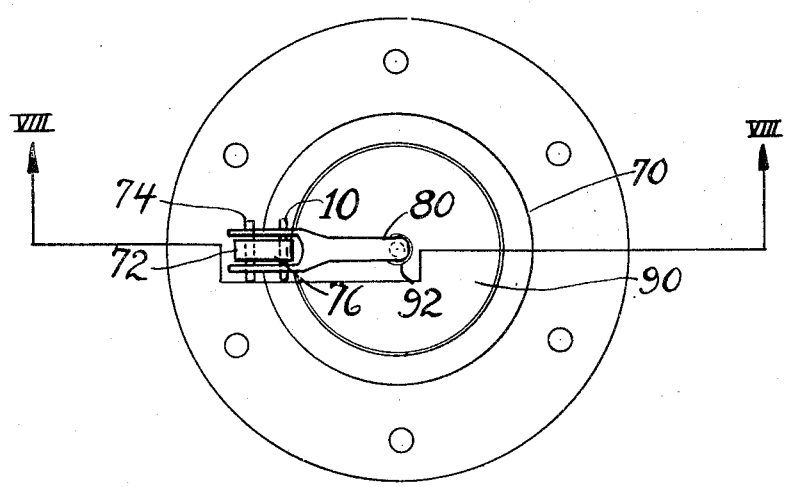
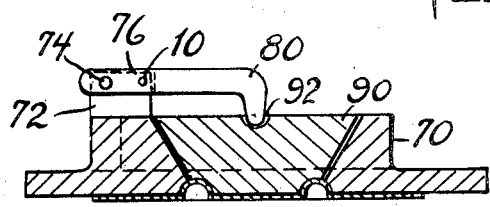
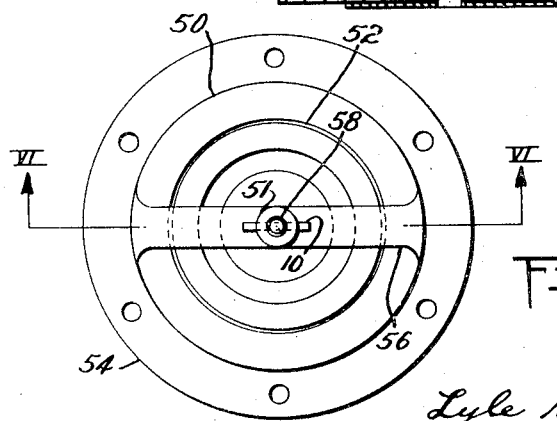
Lyle M. Cooper Inventor
By P. L. Young Attorney Patented Nov. 8, 1949

2,487,104

UNITED STATES PATENT OFFICE 2,487,104

PRESSURE VESSEL SAFETY DEVICE

Lyle M. Cooper, Rahway, N. J., assignor to Standard Oil Development Company, a corporation of Delaware Application February 14, 1945, Serial No. 577,832

6 Claims. (Cl. 220—89)

This invention relates to safety devices, and more particularly to a safety relief device of the blow-out head type. In many industries, and possibly particularly in the chemical and petroleum industries, it is a requisite equipment feature to have a safety valve or relief arrangement for releasing excessive pressures in systems which cannot otherwise be exhausted in order to prevent hazardous and excessive strains in the equipment. These safety devices on high pressure equipment must function automatically when an excessive pressure is attained and give immediate relief. Thus, in petroleum refinery cracking equipment it may be necessary not only to relieve the excessive pressure but also to function simultaneously to cause the addition to the system of an extraneous medium to prevent explosion and fire hazards. Similarly, in many industries it is often necessary to store materials which will produce or give inflammable, explosive gases or vapors, especially if abnormal conditions accidentally develop, so that the receptacle should have a normally closed explosion relief aperture provided with means to insure the opening of the relief aperture and to prevent a hazardous explosion.

It is a necessary feature of most safety devices that the relief occurs within a narrow range of excessive pressure or temperature conditions. A means to insure pressure relief at a definite value has been attained in prior art devices by the employment of spring-loaded devices or an assembly involving a piston backed up with plates transmitting the pressure load to rods thus loaded in shear. Improvement of such devices has been to protect the pressure-resisting element from the action of corrosive gases or liquids by means of a film or thin disc of corrosion-resistant material. The important feature in all such devices has been to insure that the pressure developed in the portion of the equipment to be protected will never be allowed to exceed a certain maximum even after prolonged exposure to the operating conditions.

In the prior art devices, the element relied upon to cause the shear of the pins or rods has been in the shape of a cylindrical piston in which the length to diameter ratio is large to prevent jamming when the pins would, under practical conditions, fail to shear symmetrically and simultaneously. Thus, the prior art devices were necessarily large and cumbersome. Also, these devices were designed to be used within pipes or on flow channels of processing equipment and are not well adapted to the purpose especially suited by the device of the present invention, namely, a release to the atmosphere or to a "blow-down drum" when connected to a nozzle on the pressure vessels. The device of the present invention is a departure from such type of devices in the use of parting surfaces so arranged to permit failure without jamming regardless of disposition or sequence of failure of the collective shear pins.

The device of the present invention depends for its essential activity upon the rupture of the calibrated shear-resisting element. This element consists of one or more pieces of suitable material in the form of pins, rivets or rods. These unit pieces are equilaterally disposed in a plane perpendicular to the axis of pressure relief movement. The pieces are fabricated from such rigid materials as metals and plastics, which are easily calibrated and standardized. The unit pieces are also of any cross-sectional shape.

The device in general consists, in its simplest embodiment, of a standard pipe flange having a generally conical circular opening through its center which is adapted to receive a similarly formed cup-shaped member of metal, plastic or other such rigid material. The co-operating surfaces of the flange and cup are such that when movement occurs the surfaces of the flange or casing and the cup move obliquely with respect to each other, that is, are adapted in a parting fit so as to be self-freeing. The cup is provided with three holes in the uppermost portion of its side walls which are aligned with similar holes in the body through which the pins or rivets or wire are passed to secure the two pieces together. The pins or rivets may be secured in place by riveting or threading or they may be set screws or keys. Since the metal strengths of the pins or rivets are usually affected by cold working such as riveting, their ends may be hollowed out or cupped so that a minimum of cold working would be required to crimp or peen the edges over. The lower plane surface of the cup is aligned with the lower surface of the body or with a shoulder turned in the central opening thereof.

In order to provide a positive, but easily fractured, seal to prevent escape of any gas or liquid at normal operating pressures, a relatively weak membrane of thin impervious material such as metal, cellophane, rubber, leather or coat of lacquer is made to cover the joint of the lower parts of the flange and the cup-shaped member so that it rests against these parts. This membrane may also extend to cover the lower surface of the cup. In this case, the cup is not brazed, welded or connected in any manner to the membrane. The contact surfaces of the body and cup are surfaces of revolution generated by a sloping line terminated at the top by a curve whose radius is no greater than the maximum diameter of the opening in the body and whose center of curvature lies diametrically opposite on the top edge of said opening. The vertical width of this curved surface zone is approximately three times the diameter of the rods or pins comprising the shear element, which is disposed centrally within the curved zone. Also, the direction of the sloping line is such that it will lie wholly within the arc formed by a downward extension of the curve.

An improved form of the device is to have the cup of generally conical form located within a somewhat larger generally conical opening in the metal body to which the cup is connected by means of the shear pins as in the more simple form of the embodiment. This improved form has the advantage that the movement upward of the cup after the pins have been sheared is not hindered by any sticking due to uneven lateral contact. The material of which the cup and the companion element are fabricated may be any relatively inert rigid material, such as a plastic or any of the commonly used metals for the construction of valve parts.

The diaphragm acting as a positive seal may be provided with a circular corrugation near its outer edge and in line with the shearing surface formed by the cup and the body. The purpose of the corrugation in the diaphragm is to impart enough flexibility to the diaphragm so that the pins or rivets will have to resist all but a negligible portion of the total force generated by the contained pressure. The circular corrugation also permits slight movement of the diaphragm, without fracturing or offering appreciable resistance, such as might occur from slight irregularities in the fit of the component parts of the device. The shear cup and body are machined to allow for the corrugation in the diaphragm and thus when diaphragms are very thin, resting surface is provided for all but a very minor portion of the diaphragm. When thicker sheet is used, however, for the diaphragm, it may be necessary to provide some clearance in the body piece directly above the groove in order to obtain adequate flexibility in the diaphragm.

In such a device the entire pressure exerted against the area of the cup will be resisted for all practical purposes by the shear resisting element. For a given cup area, the size and composition of the pins or rods, which generally constitute this shear resisting element, depend upon the pressure at which failure is to occur. By the proper selection of the pins or rods, great flexibility and accuracy may be obtained in predetermining the actual pressure at which failure will occur. Three pins are generally used as the shear element in order to give a uniform distribution of shearing stress and greatest reliability of operation. Also, bushings may be provided to be inserted into the pin holes for the purpose of adapting the device to the use of various sizes of pins or rods. By such a means a greater degree of flexibility with the minimum standard basic components will be obtained. Also, it will be obvious to those familiar with the art that from practical considerations when dealing with relatively low operating pressures it may be desirable to combine and incorporate with the shearing principle contained herein a system of levers and fulcrums which will serve to reduce or multiply the shearing zones on the rods to values which may be most consistent with efficient functioning and fabrication of the device. Also, in many cases, it is desirable that a blowout head such as the device described herein be able not only to act as a safety device against excessive pressure applied to one side but that it be adapted to withstand a certain amount of excess pressure from the opposite side as might be encountered when the device was placed in the interconnecting lines joining several pieces of equipment having varying or different operating pressures.

For this purpose, a back pressure plate may be utilized. Such a plate may suitably consist of a steel or other metal plate having a circular ridge on one side designed to match and fit into the circular groove in the thin diaphragm. In addition numerous holes may be spaced in the area corresponding roughly to the bottom of the shear cup. Such a plate is then placed against the thin diaphragm on the side opposite the shear cup and serves to reinforce and back up the diaphragm against any positive pressures developed on the outer or shear cup side of the diaphragm while the holes in the plate permit the device to function without hindrance under the normal conditions for which the device is designed.

Atmospheric corrosion and exclusion of foreign matter may be guarded against by applying a covering, jointly, on the top surfaces of the cup and flange, such a covering being in the form of a flat annular sheet of thin metal, lacquer or lacquered fabric, rubber or any material deemed suitable, applied by brazing, welding, sweating, cementing or some similar process.

In order that the invention may be more fully understood, the following specific description will be presented of particular embodiments.

Figure 2:
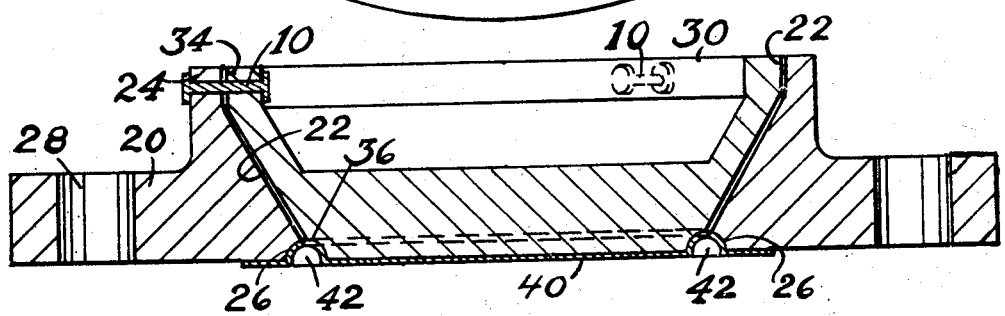

Figure 1 presents a top view of the device. Figure 2 is a cross-sectional view taken along the line II—II of Figure 1. Figure 3 presents an enlarged detail of a lower portion of the device. Figure 4 is a cross-sectional view similar to Figure 2 showing particularly an added plate feature (100). Figures 5 and 7 are top views of alternate forms of the device. Figures 6 and 8 are cross-sectional views taken along the line VI—VI of Figure 5 and the line VIII—VIII of Figure 7, respectively.

In Figure 1, the device is shown as involving an annular body 20 in the general form of a typical pipe flange and having a circular central opening 22 whose interior surface assumes a conical shape, sloping outward from the lower to the upper portion and terminating near the top, in a narrow zone 24 having a width of approximately three rivet or pin (10) diameters, said zone preferably having an inner wall surface curving upwardly and outwardly from its junction with the upper end of the body opening. The desired degree of curvature may be produced as an arc of a circle having a radius no greater than the diameter of the opening formed within said zone. The bottom of the conical surface terminates at and meets the top surface of an annular groove 26 having the cross-sectional outline of one quadrant of a circle whose center lies in the bottom plane of the body 20 at a point approximately vertically below the intersection of surfaces 22 and 26. In the upper portion of body 20 and on a horizontal line located on the center of the curved zone 24, three or more holes are equally spaced circumferentially and drilled radially through the walls of the body 20. The bottom portion of the body 20 is extended radially to form a flange such as is usual in ordinary pipe fittings and through which several holes 28 may be drilled for the purpose of attachment to pipe lines or the nozzles on pieces of equipment.

Into the central opening 22 is adapted a cup-shaped component 30. This cup 30 is centrally assembled into the body piece 20 and has its exterior surface 32 corresponding closely with the interior surface of the central opening 22 and 24 in the body 20 excepting at the bottom. At the bottom of the cup the sloping exterior surface 32 terminates at and meets the top surface of an annular groove 36 having the cross-sectional outline of one quadrant of a circle whose center lies in the bottom plane of body 20 and cup 30 approximately on a vertical line below the intersection of the two surfaces. The cup 30 is assembled into body 20 so that the quadrant surfaces align to form an annular groove of semicircular cross-section, continuously throughout the bottom plane of same. A modification of the grooved surface 26 in the body is shown in Figure 3 in which is an enlarged sectional view of the annular groove formed by 26 and 36. In Figure 3 the body groove contour 26 is shown as changing its curvature, at some tangentially common point, to that of a curve 21 of greater radius so that the intersection of 21 with 22 will occur some distance above the corresponding intersection of 32 and 36 on the cup 30. This modification provides clearance for flexible functioning as to be subsequently explained.

A relatively thin diaphragm or membrane 40, of metal, rubber, plastic or other such material, is placed in the position shown. This membrane seals the joint of the body 20 and the cup 30. Usually it is sealed against the body 20 by soldering, welding, sweating, or by compression such as would result when the body 20 was clamped or bolted against a typical pipe flange or nozzle with the outer edge of the diaphragm 40 interposed between the compressing surfaces. In the latter case, the diaphragm 40 serves the dual purpose of a sealing gasket for the bolting or clamped connection and also as an impermeable diaphragm in the proper functioning of the device. A corrugation 42 having the same radius of curvature as the groove 36 in the component part 30 is pressed, spun, or otherwise formed in diaphragm 40. This corrugation forms a circle concentric with the disc and coinciding with the composite groove formed at the bottom region of the matching surfaces 22 and 32 of parts 20 and 30 respectively. The corrugation imparts a certain degree of desirable, (and when thicker diaphragms are used) necessary flexibility to the diaphragm.

The component parts described are assembled as follows: Diaphragm 40 is pressed against, or fastened to, the body 20 so that the opening therein is hermetically sealed. Next the cup 30 is placed into the body in such a position that the radially drilled holes in its upper portion are aligned with the radially drilled holes in the upper portion of the body walls. Next the rods or pins 10 which have been made of such material, size and temper that the amount of force necessary to cause shear laterally along a diametral plane has been determined within reasonable practical limits, are inserted through the aligning holes in 20 and 30 thus assembling or connecting the body 20 and cup 30 more or less permanently or until the proper functioning of the device causes the pins 10 to be sheared through. Rods 10 are then preferably peened or riveted at the ends in order to prevent their inadvertent removal.

When this device as thus assembled is connected to a piece of equipment in such a manner that the contained pressure is exerted against the diaphragm 40, the latter is prevented from excessive distortion or rupture by virtue of its practically continuous contact against the bottom surface of cup 30. Thus, as long as the cup 30 remains in its assembled position, diaphragm 40 cannot be distorted upward from pressures applied from below. Cup 30 being connected to body 20 by means of the rods 10 cannot move until the pressure applied against the diaphragm 40 is great enough to cause the rods 10 to shear across a diametral plane. The ultimate restraining force preventing escape or relief of the contained pressure in the equipment to which the device is attached is thus the resistance of the rods 10 to shear across a diametral plane. When the shearing forces produced by the contained pressure reach the point at which they exceed the combined shearing resistance of the rods 10, shearing of the latter occurs and cup 30 will be freed from the body 20. Since support is thus removed from diaphragm 40 the latter distorts and readily fails, releasing the contained or enclosed pressure. For most efficient functioning of the device, the ratio of the ultimate resistance of the pins 10 in shear to the ultimate rupturing resistance of the diaphragm should be as high as practical, a desirable minimum being of the order of ten to one.

In order to provide for pressure exerted against the weak diaphragm 40 from the upper or discharge side being greater than that applied to the lower or internal side, which could cause the diaphragm to be ruptured or harmfully distorted, a plate 100 is used, as shown in Figure 4, in conjunction with the presently described device. The plate 100 is in essence merely a rigid grid or perforated supporting plate having a contour devised to contact the lower face of diaphragm 40 over such an area and in such a manner that the latter will not be distorted if reverse pressure were applied. No claims are made upon the originality of this supplementary component. It is merely shown as a means of adopting the main device to a certain condition.

In Figures 5, 6, 7 and 8, alternate forms of the device are illustrated. In Figures 5 and 6, the shear pin 10 is similar to that shown in Figure 1. The annular body 50 has a conical shape with an interior central opening 52 provided with connection flange 54 and a continuous arm or bridge 56 projecting upward and across the central opening. The bridge or arm 56 has at its central point and directly over the center of the opening a vertical hole 58 through a boss 51 and also a horizontal hole 53 through boss 51. The cup 60 is similar to the cup 30 shown in Figure 1 except that it has a conical outer contour to match the body above and a vertical central projection in the form of a round rod 62 rising from its central point extending upward through vertical hole 58 in bridge 56. Also shown is a central horizontal hole 64 through rod 62 aligning with hole 53 in boss 51. When pin 10 is inserted jointly into holes 53 and 64, it serves to lock the body 50 and the cup 60 in assembly. Pressure exerted on diaphragm 40 is resisted by the pin 10 until the shearing force exceeds the shearing resistance of the pin in double shear at which time cup 60 will cease to reinforce diaphragm 40 and thus ruptures to relieve the pressure in the equipment to which the device is attached.

In Figures 7 and 8, the shear pin 10 is the same as that shown in Figure 1. The annular body 70 consists essentially the same as in Figures 5 and 6, having no radial holes in vertical walls. The body has a vertical projection 72 above the side wall on one side, which projection has two holes 74 and 76, one to serve as a bearing for a shaft, the other adapted to receive pin 10. The arm 80 is made rigid by virtue of pin 10 and the shaft 82 which passes jointly through the arm 80 and the projection 72. The end of arm 80 is turned down and is in alignment with the vertical center line of the body. The center piece 90 is essentially the same as the cupellate structures shown in Figure 5 except it is shown solid and having a central depression 92 adapted to receive the end of arm 80 in rolling contact. The force exerted against 90 is transmitted to and resisted by the arm 80 whose motion is resisted in turn by the shaft 82 and pin 10 and by virtue of the lever arms involved the shearing force on pin 10 is multiplied.

Other embodiments of the invention are believed similarly evident to those familiar with the art to which the device of this invention relates.

What is claimed is:

1. A pressure relief device, comprising an orifice means, including a frusto-conical passageway therethrough the wall of which diverges outwardly from the inner end thereof, a closure member for said passageway, substantially conforming to the contour thereof, freely disposed therein with the inner end in substantially coplanar relation to the inner surface of the orifice means, a continuous recess in each of the adjoining inner edge portions of said closure and orifice means cooperating to form an annular recess of substantially semicircular cross-section therebetween, a frangible membrane over the inner end of said passageway, secured circumferentially to the orifice means in supported contact with the inner end of said closure member, an annular corrugation on the upper surface of said membrane fitting the annular recess, and frangible means carried by said orifice means and normally engaging the closure to retain it within said passageway in supporting contact with said membrane.

2. A pressure relief device according to claim 1, in which the recess in said closure member and the recess in said orifice means have a common center of cross-sectional curvature.

3. A pressure relief device according to claim 1, in which the recess in said orifice means has a cross-sectional curvature of greater radius than that of the recess in said closure.

4. A pressure relief device according to claim 1, in which the frangible means carried by said orifice means is a lever arm pivotally mounted on said means at one end, at the other end engaging the outer end of said closure member, and a frangible pin element normally retaining said lever arm in fixed relation to its pivotal mount.

5. A pressure relief device, comprising an orifice means, including a frusto-conical passageway therethrough, the wall of which diverges outwardly from the inner end thereof, a closure member for said passageway, substantially conforming to the contour thereof, freely disposed therein with the inner end in substantially coplanar relation to the inner surface of the orifice means, a continuous recess in each of the adjoining inner edge portions of said closure and orifice means cooperating to form an annular recess of substantially semicircular cross-section therebetween, a frangible membrane over the inner end of said passageway, secured circumferentially to the orifice means in supported contact with the inner end of said closure member, an annular corrugation on the upper surface of said membrane fitting into the annular recess, and a plurality of frangible closure retaining elements disposed radially between said closure and orifice means in symmetrically spaced relation circumferentially thereof, connecting said closure and orifice means and supporting said member in spaced relation to the wall of said passageway in contact with said membrane.

6. A pressure relief device, comprising an orifice means, including a frusto-conical passageway therethrough, the wall of which diverges outwardly from the inner end thereof, a collar portion on the outer surface of said orifice means, concentric with the passageway, with the inner wall portions forming a substantially continuous surface, a closure member for said passageway substantially conforming to the contour thereof, freely disposed therein with the inner end in substantially coplanar relation to the inner surface of the orifice means, a collar portion on the outer end of said closure member the outer wall surface of said collar forming a substantially continuous surface with that of the closure member, a continuous recess in each of the adjoining edge portions of said closure and orifice means cooperating to form an annular recess of substantially semicircular cross-section therebetween, a frangible membrane over the inner end of said passageway secured circumferentially to the orifice means in supported contact with the inner end of said closure member, an annular corrugation on the upper surface of said membrane fitting into the annular recess, and a plurality of frangible pin elements carried by the orifice collar portion in symmetrically spaced relation circumferentially thereof and extending radially inward normally to engage the closure collar portion and retain the closure member within said passageway in supporting contact with said membrane.

LYLE M. COOPER.

REFERENCES CITED

The following references are of record in the file of this patent:

UNITED STATES PATENTS

| Number | Name | Date |
| --- | --- | --- |
| 418,357 | Pearson | Dec. 31, 1889 |
| 1,219,493 | Scott | Mar. 20, 1917 |
| 1,248,578 | Vuilleumier | Dec. 4, 1917 |
| 1,697,199 | McKenzie-Martin | Jan. 1, 1929 |
| 1,796,200 | Grieshaber | Mar. 10, 1931 |
| 1,954,285 | Denk et al. | Apr. 10, 1934 |
| 1,993,301 | Tryon et al. | Mar. 5, 1935 |
| 2,062,381 | Tryon et al. | Dec. 1, 1936 |
| 2,079,164 | Glab | May 4, 1937 |
| 2,098,399 | Munson | Nov. 9, 1937 |
| 2,194,159 | Bonyun et al. | Mar. 19, 1940 |
| 2,276,830 | Doran | Mar. 17, 1942 |